(12) United States Patent
Hall (10) Patent No.: US 8,220,839 B2
(45) Date of Patent: Jul. 17, 2012

(54) PIPE INSERT

(75) Inventor: Derek Shane Hall, Perth (AU)

(73) Assignee: Hydrocom Pty Ltd, West Perth, Western Australia (AU)

( * ) Notice: Subject to any disclaimer, the term of this patent is extended or adjusted under 35 U.S.C. 154(b) by 248 days.

(21) Appl. No.: 12/431,090

(22) Filed: Apr. 28, 2009

(65) Prior Publication Data
US 2009/0236847 A1    Sep. 24, 2009

Related U.S. Application Data

(63) Continuation-in-part of application No. 10/592,012, filed as application No. PCT/AU2005/000331 on Mar. 9, 2005, now abandoned.

(51) Int. Cl.
*F16L 15/02* (2006.01)

(52) U.S. Cl. .................. 285/302; 285/145.1; 285/145.4

(58) Field of Classification Search .......... 285/302, 285/298, 417, 145.1, 145.2, 145.4, 369, 300, 285/301, 299
See application file for complete search history.

(56) References Cited

U.S. PATENT DOCUMENTS

| | | | |
|---|---|---|---|
| 376,137 A | 1/1888 | Butler | |
| 1,363,974 A | 12/1920 | Heylman | |
| 1,475,289 A * | 11/1923 | Diescher | 285/299 |
| 3,356,391 A * | 12/1967 | Bailey | 285/298 |
| 3,807,503 A | 4/1974 | Iasillo, Sr. | |
| 3,907,334 A | 9/1975 | Schera, Jr. | |
| 4,577,659 A * | 3/1986 | Gembus et al. | 285/300 |
| 4,775,008 A * | 10/1988 | Cameron | 285/302 |
| 4,776,617 A | 10/1988 | Sato | |
| 4,810,008 A | 3/1989 | Brodie | |
| 4,932,686 A | 6/1990 | Anderson, Jr. | |
| 4,998,756 A | 3/1991 | Hart | |
| 5,052,721 A | 10/1991 | Gorman, Jr. | |
| 6,056,329 A | 5/2000 | Kitani et al. | |
| 6,059,321 A * | 5/2000 | Lyall, III | 285/302 |

(Continued)

FOREIGN PATENT DOCUMENTS

CA    2 296 195    5/2001

(Continued)

OTHER PUBLICATIONS

Derwent Abstract Accession No. 99-291011/25, JP 11094162A (Sekisui Chemical Industries Co. Ltd), Apr. 9, 1999.

(Continued)

*Primary Examiner* — David E Bochna
(74) *Attorney, Agent, or Firm* — Gottlieb, Rackman & Reisman, P.C.

(57) ABSTRACT

A pipe insert providing a connection between pipe ends allowing fluid flow access between the pipe ends. The pipe insert having a central section with an internal thread that extends along the length of the central section and outer sections having inner and outer threaded ends. The inner threads allow attaching of the outer section into the central section so that the pipe insert may vary the relative displacement between the free ends of the pipe insert to correspond to the spacing between the pipe ends. The outer threaded ends having a releasably attaching connection to the outer section to provide a connection between the spaced pipe ends. The pipe insert is particularly useful during replacement of an appliance located between the pipe ends. The pipe insert is adapted to receive flow control and/or sensing element for measurement of fluid flow between the pipe ends.

16 Claims, 5 Drawing Sheets

U.S. PATENT DOCUMENTS

| | | | | |
|---|---|---|---|---|
| 6,070,912 | A | * | 6/2000 | Latham .................. 285/416 |
| 6,098,312 | A | | 8/2000 | Tuggle |
| 6,145,893 | A | | 11/2000 | Kuo |
| 6,299,217 | B1 | | 10/2001 | Saito et al. |
| 6,578,876 | B2 | * | 6/2003 | Guertin, Jr. ............. 285/333 |
| 7,111,873 | B1 | | 9/2006 | Coogle |
| 7,677,607 | B2 | * | 3/2010 | Densel ................... 285/298 |

FOREIGN PATENT DOCUMENTS

| | | |
|---|---|---|
| DE | 861769 | 1/1953 |
| DE | 1816842 | 6/1970 |
| DE | 3515169 | 11/1985 |
| EP | 0 396 029 | 9/1992 |
| GB | 2102091 | 1/1983 |

OTHER PUBLICATIONS

Derwent Abstract Accession No. 1999-605489/52, JP 11264491A (Osaka Gas Co. Ltd), Sep. 28, 1999.

* cited by examiner

PIPE INSERT

CROSS-REFERENCE TO THE RELATED APPLICATIONS

This application is a continuation-in-part application of the U.S. Ser. No. 10/592,012, filed Dec. 8, 2006, now abandoned which is a §371 national phase application of PCT/AU 2005/000331 filed on Mar. 9, 2005, which claims priority from Australian Patent Application No. 2004901174, the contents of which are incorporated herein by reference.

FIELD OF THE INVENTION

The present invention relates to a pipe insert and also to a method of connecting at least two pipe ends using such a pipe insert.

BACKGROUND

The invention has application to industrial process piping installations which are common to many industries, including the oil and gas, petrochemical and mining industries. A requirement associated with most major projects concerning such installations is that the piping be hydrostatically and/or pneumatically tested, prior to pre-commissioning, so as to ensure conformity with design and operating parameters. Such testing is generally followed by a cleaning phase which may involve subsonic air blasting. Until the installation is commissioned, it is not desirable to expose control elements, such as valves and like elements, to the rigours that will be experienced during assembly of the installation, cleaning of the assembled installation and testing of the installation prior to commissioning. Throughout the specification and claims the term "appliance" shall be taken as referring to control elements, such as valves, gauges, flow restrictors and like elements, which are installed in a fluid line in order to control and/or monitor the fluid flow through fluid line.

For this reason, it is not uncommon for such control elements to be installed and then removed as many as three times over the course of construction, testing and cleaning. This generally involves construction of purpose-built temporary pipe inserts (which may be known in the industry as test pups, jumper spools, temporary spools or test bobbins and which will hereinafter be referred to as "test pups" or a "test pup" as the context requires) to replace each control element. In installations which incorporate tens or hundreds of control elements, this practice is unwieldy and wasteful because, in most instances, a new test pup is created each time and for each control element and, where the installation is to be subjected to testing, each test pup must be fabricated to the same standards as the control element which it is intended to replace. Associated shortcomings in this regard include triple-handling and installation, which compromises the mechanical integrity of the pipe system, as well as the need to subject the test pups to non-destructive testing to ensure their fitness for use during testing and cleaning. This results in unnecessary expense, time delays and safety risks. In addition, there is an increased likelihood of damage to the control elements each time they are installed and then removed.

DISCLOSURE OF THE INVENTION

Throughout the specification and claims, unless the context requires otherwise, the word "comprise" or variations such as "comprises" or "comprising", will be understood to imply the inclusion of a stated integer or group of integers but not the exclusion of any other integer or group of integers.

According to one aspect of the present invention, there is provided a pipe insert which in use is to provide a connection between at least two spaced pipe ends which are fixed relative to each other, said pipe ends each having first connection means enabling the connection of an appliance between the pipe ends, the insert being intended in use to extend across the space between the pipe ends to replace the appliance to provide a fluid tight interconnection between each pipe end and the abutting end of the insert and to provide substantially uninhibited fluid flow access between pipe ends the insert having at two end portions and a central portion interconnected to the adjacent ends of the end portions, the portions being threadably inter-engaged, wherein the threaded connection of one end portion to the central portion is of the opposite hand to the threaded connection of the other end portion to the central portion whereby the relative axial displacement is varied by causing relative rotation of one or more of the portions relative to the adjacent portion, to be able to vary the relative displacement between the free ends to correspond to the spacing between the pipe ends, a seal provided between each end portion and the central portion to sealingly isolate the interior of the pipe insert from the exterior of the pipe insert.

According to a preferred feature of the invention the pipe insert is adapted to receive at least one of a selection of flow control and/or sensing elements.

According to a preferred feature of the invention the pipe insert incorporates a flow control and/or sensing elements.

According to a preferred feature of the invention the second connection means are removable from the free ends of the end portions and the second connection means which are be affixed to the free ends can be are selectable from a plurality of differing forms of second connection means adapted to conform with the first connection means of the pipe ends, each second connections being associated with a seal which is located at the junction of the second connection and the end portion.

According to a preferred feature of the invention the second connections are threadably engaged with threaded formations on the free ends of the end portions.

According to a preferred feature of the invention the end portions of the insert are displaceable along a common axis.

According to a preferred feature of the invention the end portions of the insert are displaceable along at least two axes which are angularly displaced from each other.

According to a preferred feature of the invention the end portions of the insert are displaceable along two axes which are substantially perpendicular to each other.

According to a preferred feature of the invention the end portions of the insert are displaceable along at least two axes which are spaced from each other.

According to a preferred feature of the invention the first connection means each comprise a flange at the respective pipe end and said second connection means each comprise a flange at the respective end wherein the first and second connection means are of a complementary form.

According to a preferred feature of the invention the pipe insert is able to accommodate the flow and pressure conditions anticipated for the appliance in use.

According to a preferred feature of the invention the internal diameter of the end portions is substantially similar to the internal diameter of the pipes associated with the pipe ends, According to a preferred feature of the invention the pipe insert is configured and arranged such that it can accommodate the anticipated mechanical loadings anticipated to be applied to the appliance in use.

According to a preferred feature of the invention the central portion is concentrically received over the end portions.

According to a preferred feature of the invention the pipe insert comprises a plurality of central portions which are threadably engaged with intermediate portions which are of similar form to the end portions.

According to a preferred feature of the invention the seal between each end portion and the central portion is located inward of the treaded formation on the respective end portion.

According to a preferred feature of the invention the seal between each end portion and the central portion is located intermediate of the threaded formation and the free end of the respective end portion.

According to a preferred feature of the invention each seal retention cap comprises an annular member which is threadably engaged with an external thread provided at the end of the central portion, said annular member has an inwardly directed flange having an inner diameter greater than the external diameter of the respective end portion, the cap retention element having an inner annular recess which cooperates with a recess of corresponding form at the end of the central portion to accommodate the seal The invention will be more fully understood in the light of the following description of specific embodiments.

BRIEF DESCRIPTION OF THE DRAWINGS

The description is made with reference to the accompanying drawings of which.

DETAILED DESCRIPTION OF SPECIFIC EMBODIMENTS

Each of the embodiments is directed to a pipe insert which in use is to provide a connection between at least two spaced pipe ends and is adjustable along at least one axis to accommodate for the spacing between the pipe ends. The application of the embodiments relate to fluid lines that are provide in industrial plants wherein the lines will be subjected to significant pressure loadings. The function of embodiments is to replace the current customised test pups that are currently in use. As in the case of the prior art customised test pups the purpose of the pipe inserts of each of the embodiments is to temporarily replace an appliance such as a flow control and/or sensing element which is to be located between the pipe ends while the installation with which the pipe ends are associated is under construction, cleaning, testing, maintenance or a like activity. During such activities there is very strong likelihood of the appliance being damaged and when it is inappropriate for the flow control and/or sensing element to be subjected to the conditions associated with that activity. Therefore during such activities it is desirable that the appliance be removed and that the connection provided by that appliance be maintained and that the test pup be able to accommodate the anticipated mechanical loadings and flow conditions expected at the location in the fluid circuit. This connection has in the past been effected by a custom made test pup which is sealingly mounted between the pipe ends and which provides the required continuity in the flow circuit. Each test pup that is made is customised to the particular location and it is not uncommon for a fresh test pup to be constructed on each occasion that it becomes necessary to remove the appliance prior to cleaning, testing, maintenance or a like activity.

It is intended that the pipe insert according to the embodiments be capable of being used repeatedly between the pipe ends and/or at different locations having differing sets of pipe ends at each instance that it becomes necessary to remove an appliance from between the pipe ends.

Figure 1:
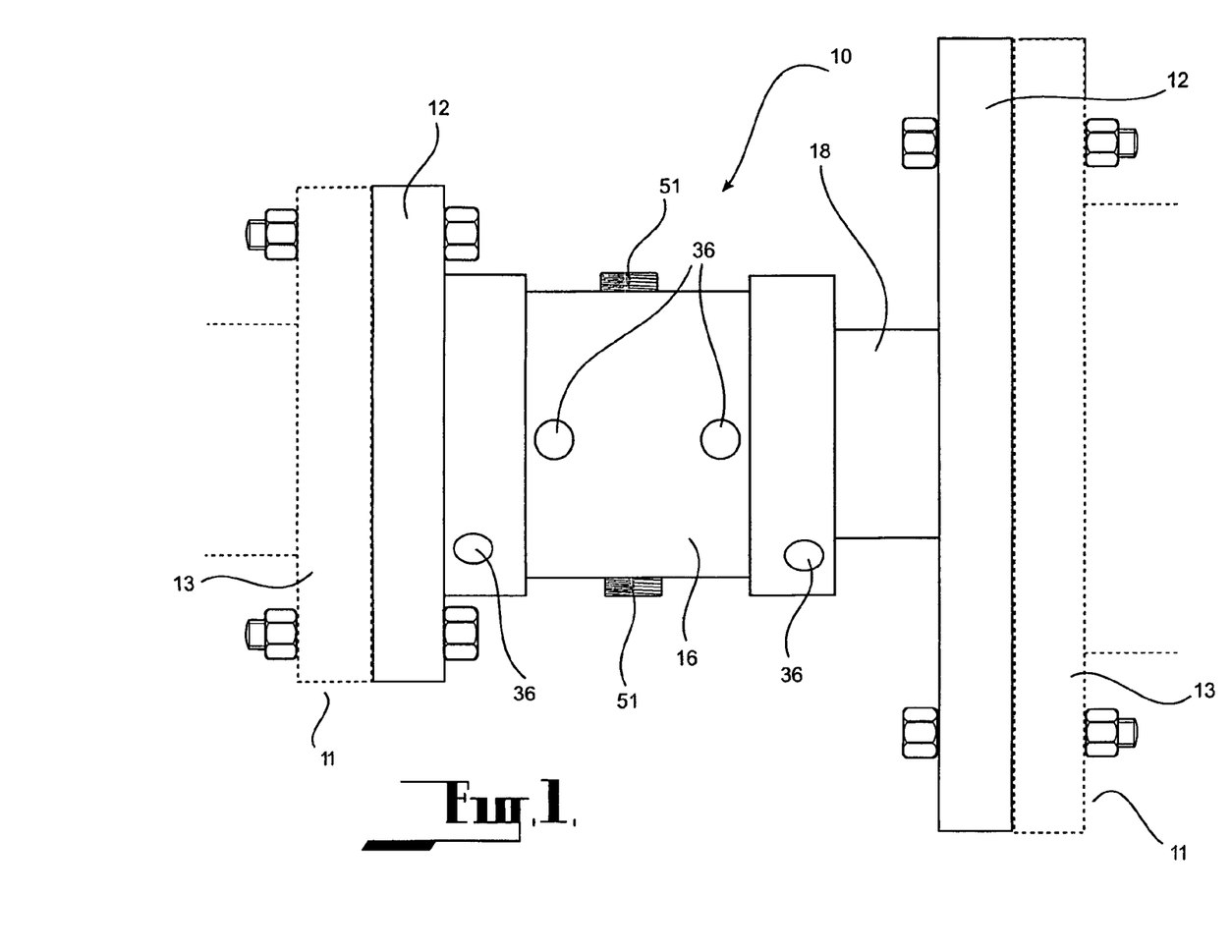
FIG. 1 is a side elevation of a pipe insert, according to a first embodiment of the invention.
Figure 2:
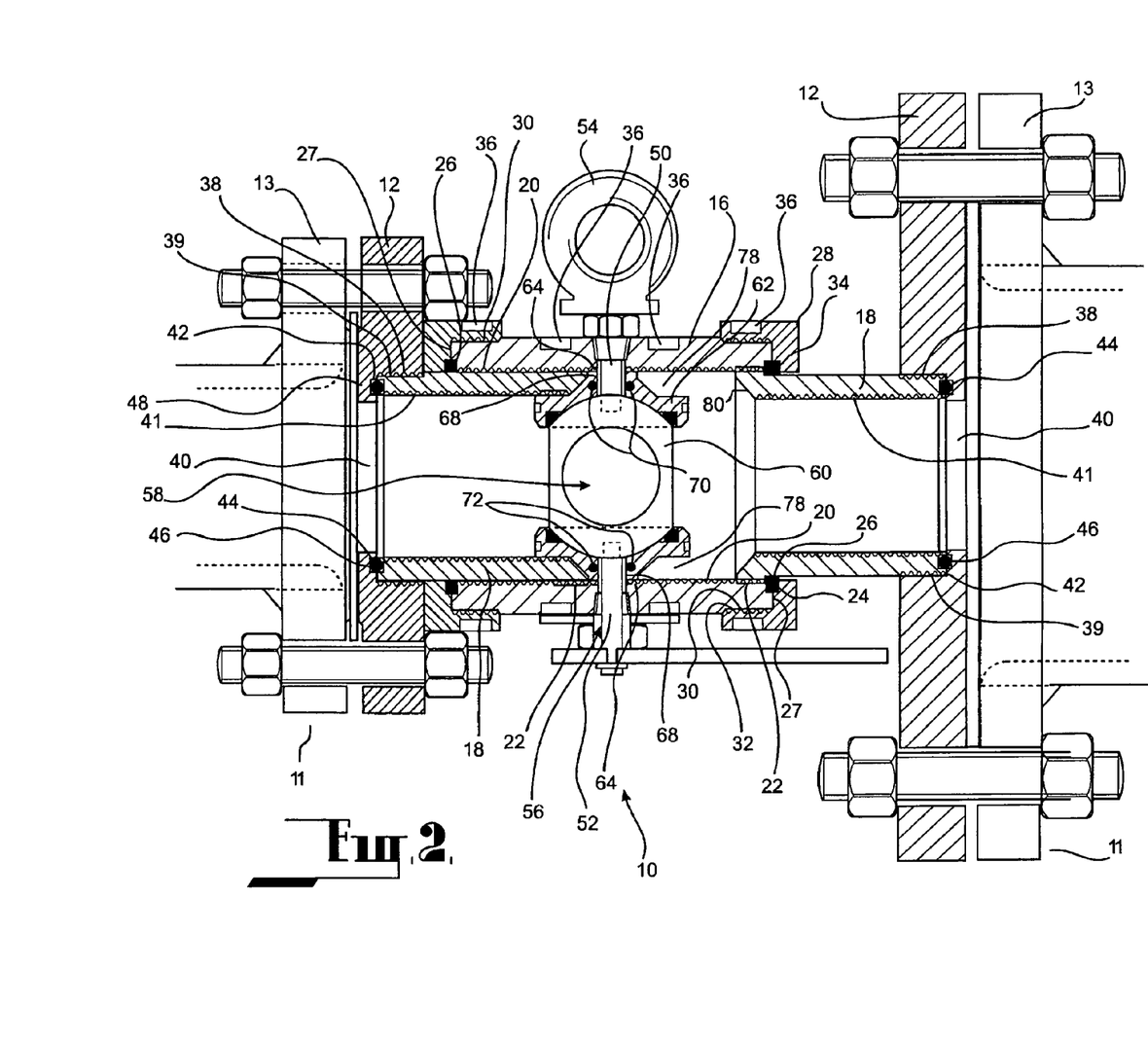
FIG. 2 is a sectional side elevation of the pipe insert according to a first embodiment of the invention as shown in FIG. 1, fitted with a lifting eye and ball valve.

The pipe insert 10 according to the first embodiment, as depicted at FIGS. 1 and 2, provides a connection between the spaced ends 11 of a pair of pipes. The insert 10 is of a tubular form and is provided at each end with connecting means in the form of flanges 12 which are adapted to be fixed to corresponding pipe flanges 13 at the ends of the pipes 11 to provide a sealed connection between the pipes. The flanges 12 take a form such that they can be clampingly and sealingly engaged with the pipe flanges 13 of the pipe. The portion of the pipe insert between the flanges 12 is tubular to permit substantially uninhibited fluid flow between the pipe ends and as will be described later can include flow control and/or sensing elements which can duplicate or provide similar functions to the appliance which is finally to be located between the pipe ends.

The portion of the insert 10 between the flanges 12 comprises a plurality of interengaged portions which comprise a central portion 16 and a pair of end portions 18 at either end of the central portion 16. The central and end portions 16 and 18 are threadably interconnected in an end to end relationship whereby, by varying the relative longitudinal position of the threadable interconnection between the sections, the length of the insert 10 can be varied.

The central portion 16 is provided along its length with internal threads 20 whereby the internal threads of one half are of an opposite hand to the other half. The end portions 18 are provided at their inner ends with corresponding external threads 22 which inter-engage with the internal threads 20 to effect the threadable interconnection between the central portion 16 and the end portions 18. The non-threaded portions of the outer faces of each end portion 18 are of a slightly reduced diameter relative to the inner ends to enable the non-threaded outer portions to be receivable within the bore of the central portion 16.

The position of each end portion 18 with respect to the central portion 16 and thus the length of the pipe insert is adjusted by screwing that end portion clockwise or anticlockwise. The end portions 18 may be adjustably displaced by different amounts with respect to the central portion 16, as shown at FIGS. 1 and 2. Alternatively the central portion can be caused to rotate on the end portions which will cause axial displacement of the end portions towards or away from each other.

The ends of the central portion are each provided with annular seal retention caps 28. Each retention cap 28 has an inner thread 30 which is threadably received with an outer thread 32 provided on the outer face of the central portion at the respective end. Each retention cap 28 is provided with an inwardly directed flange at its outer axial face Seals 26 are received around the end portions 18 and are accommodated in the recess 24, defined between the respective retention cap 28 and end face 27 and as result the seals 26 are entrapped between the flange of each locking cap 28 and the respective end face 27 of the central portion and the outer face of the respective end portion. The seals 26 take the form of single sided hydraulic rod seals.

According to the first embodiment the inner faces of the end portions 18 are provided with oppositely-handed internal threads 41 so that they may receive further end portions therein, in accordance with other embodiments as described below. In addition the end portions 18 are provided, at their outer ends, with external threads 38 to enable them to be engaged with the flanges 12 which in turn are provided with bores 40 having corresponding threads 39 to inter-engage with threads 38 such that the flanges 12 may be screwed onto, and thus mounted on, the end portions 18. The removable nature of the flanges 12 means that the insert 10 has the versatility to be able to be used with pipe flanges of varying diameters, types and ratings according to the nature of the pipe flanges with which the pipe insert is to be used. Suitable seals 44 are provided between the ends of the end portions and the flange to effect a fluid tight seal there between The wall of the central portion 16 is formed with a pair of opposed radial bores 50 and 52 and each bore is adapted to sealingly receive one of a selection appliances which can include control and/or sensing elements. The appliances which may include a lifting eye, a ball valve lever assembly, a pressure gauge and a fill/drain point. Where an appliance does not need not be fitted, one or each radial bore may be sealed with a threaded plug 51, as shown at FIG. 1.

As shown at FIG. 2 and by way of example only, the selected control appliances fitted to the first embodiment can comprise a lifting eye 54, received in one bore 50, and a ball valve lever assembly 56, received in the other bore 52. The ball valve lever assembly is associated with a ball valve 58 which may be received in the insert 10. The ball valve 58 comprises the ball valve lever assembly 56, a ball member 60, which is receivable through either end of the central portion, and two ball member retaining covers 62 to receive the ball member 60 there between. The retaining covers 62 are provided with external threads 64 to be engageable with the internal threads 20 of the central portion 16. Inner ends of the retaining covers 62 are received against annular faces 68 provided near the middle of the central portion 16 and integrally formed therewith. Recesses 70 are provided in the retaining covers 62 at their inner ends, the recesses 70 receiving seals 72 which engage the faces 68. The retaining covers 62 have, between their inner and outer ends, tapered annular relief portions 78 to accommodate correspondingly-tapered portions 80 provided at the inner ends of the end portions 18, thereby allowing for maximum retraction of the end portions 18, within the central portion 16, when the ball valve 58 is being utilised, to increase the range of length adjustment of the insert 10.

In the following description of further embodiments of the invention, like components will be designated with the same reference numerals.

Figure 3:
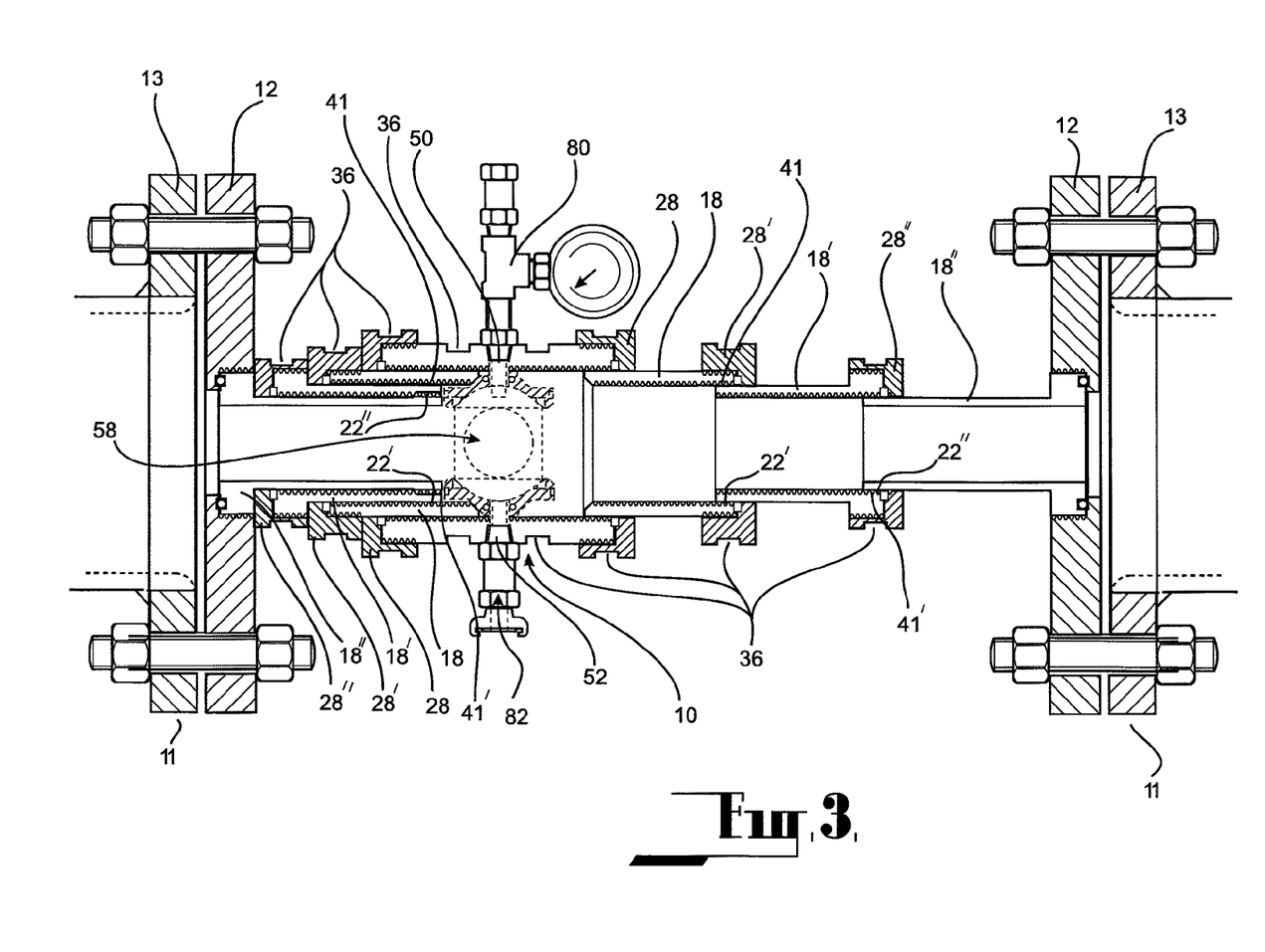
FIG. 3 is a sectional side elevation view of a pipe insert according to a second embodiment of the invention, fitted with a pressure gauge and fill/drain point.

The pipe insert 10 according to the second embodiment, as shown at FIG. 3, is based on a variation of the first embodiment and comprises, in addition to having end portions 18 at each side of the central portion 16, a pair of threadably interengaged, telescopically interconnected further end portions 18' and 18" at each end. This enables the pipe insert 10 to be used in connecting a variety of pipe ends having a greater variation in their degree of separation since the further end portions 18' and 18" provide the pipe insert 10 of the second embodiment with a greater range of length adjustment when compared to the pipe insert of the first embodiment.

The central portion 16 and end portions 18 are the same pieces as used in the case of the first embodiment, the additional pieces being suitably configured so that the insert 10 can accommodate a ball valve 58 (as shown in broken lines in FIG. 3), with the end portions 18, 18' and 18" fully retracted.

The further end portions 18' are provided, at their inner ends, with external threads 22' which engage with the internal threads 41 respectively, provided in the end portions 18. The remaining portions of the outer face of each further end portion 18' are of a reduced diameter relative to the inner ends, so as to enable the further end portions 18' to be received within the end portions 18.

The further end portions 18' are provided with internal, oppositely-handed threads 41' which engage with corresponding external threads 22" provided at the inner ends of the further end portions 18". The remaining portions of the outer face of each further end portion 18" are also of a reduced diameter relative to the inner ends, so as to enable the further end portions 18" to be received within the further end portions 18'.

The flanges 12 are mounted to the outer ends of the further end portions 18", those outer ends being configured as described in connection with the first embodiment to provide for sealing connection with the flanges 12.

Annular retention caps 28, 28' and 28", with associated seals 26 are provided at the connections between each section, the retention caps and sealing arrangements being of the type described in connection with the first embodiment.

By way of example only, the selected control elements for the second embodiment comprises a pressure gauge 80, received in bore 50, and a fill/drain point 82, received in bore 52. Again, where a control elements need not be fitted, one or each radial bore may be sealed with a threaded plug, as shown at FIG. 1 in connection with the first embodiment.

Figure 4:
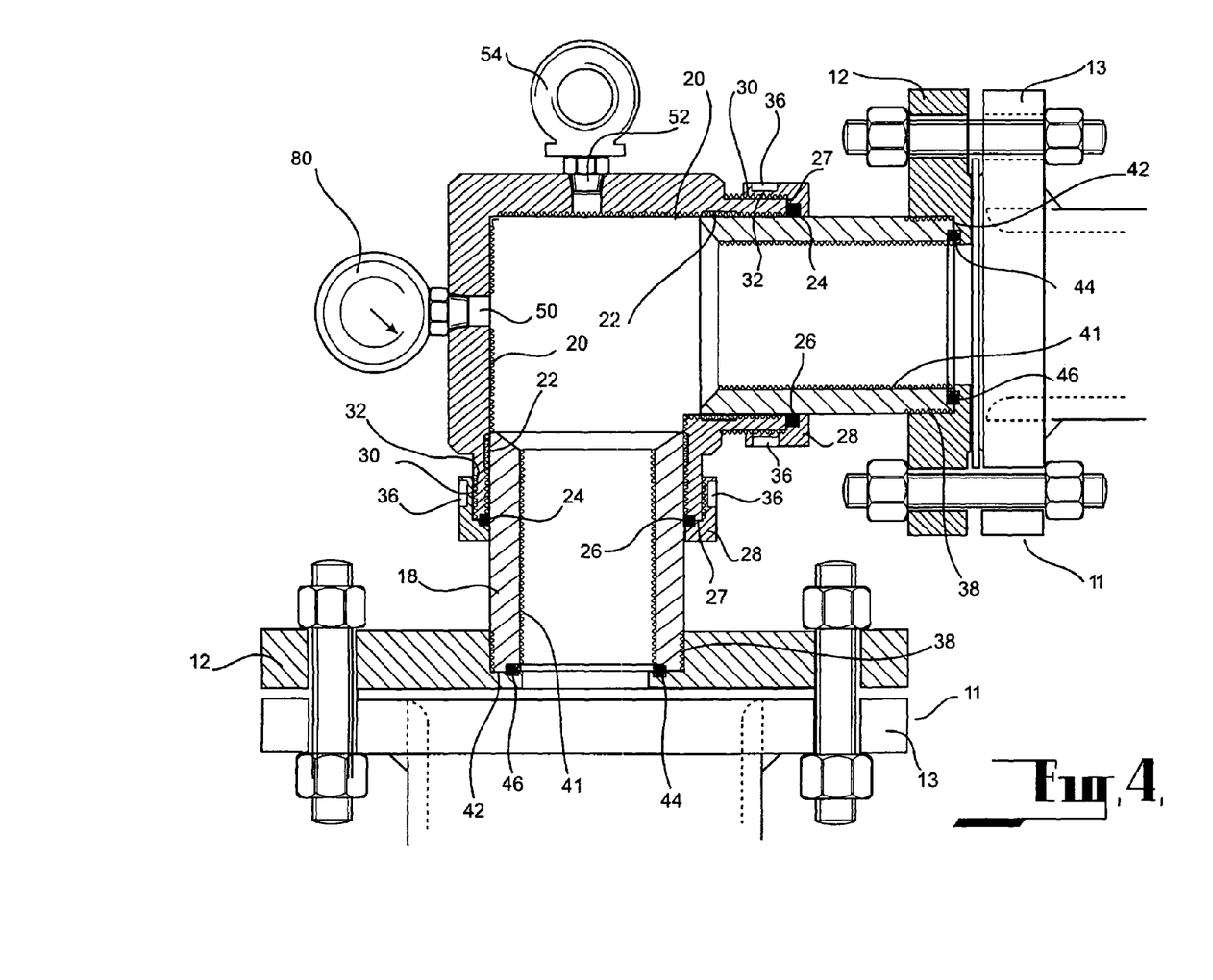
FIG. 4 is a sectional side elevation of a pipe insert according to a third embodiment of the invention, fitted with a pressure gauge and lifting eye.

The pipe insert 10 according to the third embodiment, as depicted at FIG. 4, is also a variation of the first embodiment with the exception that the central portion 16, comprises 90° elbow piece. The insert is thus adjustable along two non-parallel axes and as such is adapted to provide a connection between two spaced pipe ends 11 which are arranged perpendicularly.

The radial bores 50 and 52 in the case of the third embodiment are arranged at 90°, rather than being opposed.

By way of example only, the selected control elements for the third embodiment comprise a pressure gauge 80, received in bore 50, and a lifting eye 54, received in bore 52. Again, where a control element need not be fitted, one or each radial bore may be sealed with a threaded plug, as already described.

It according to a variation of the embodiments a pair of central elements of the form as described can be interconnected by an intermediate portion which is of the same from as the end portions and the free end of the central portions can receive the end portions Other embodiments exist wherein there is a transverse offset between the end portion to one side of the central portion and the end portion to the other side of the central portion to accommodate for circumstances where the pipe ends are out of coaxial alignment.

In addition, there exist alternative embodiments which are adapted to connect more than two pipe ends, for example inserts formed as tee-pieces or four-way pieces, those inserts being adjustable in some or all longitudinal axes, so as to vary the positions of the connectors according to the spacing of the pipe ends.

Figure 5:
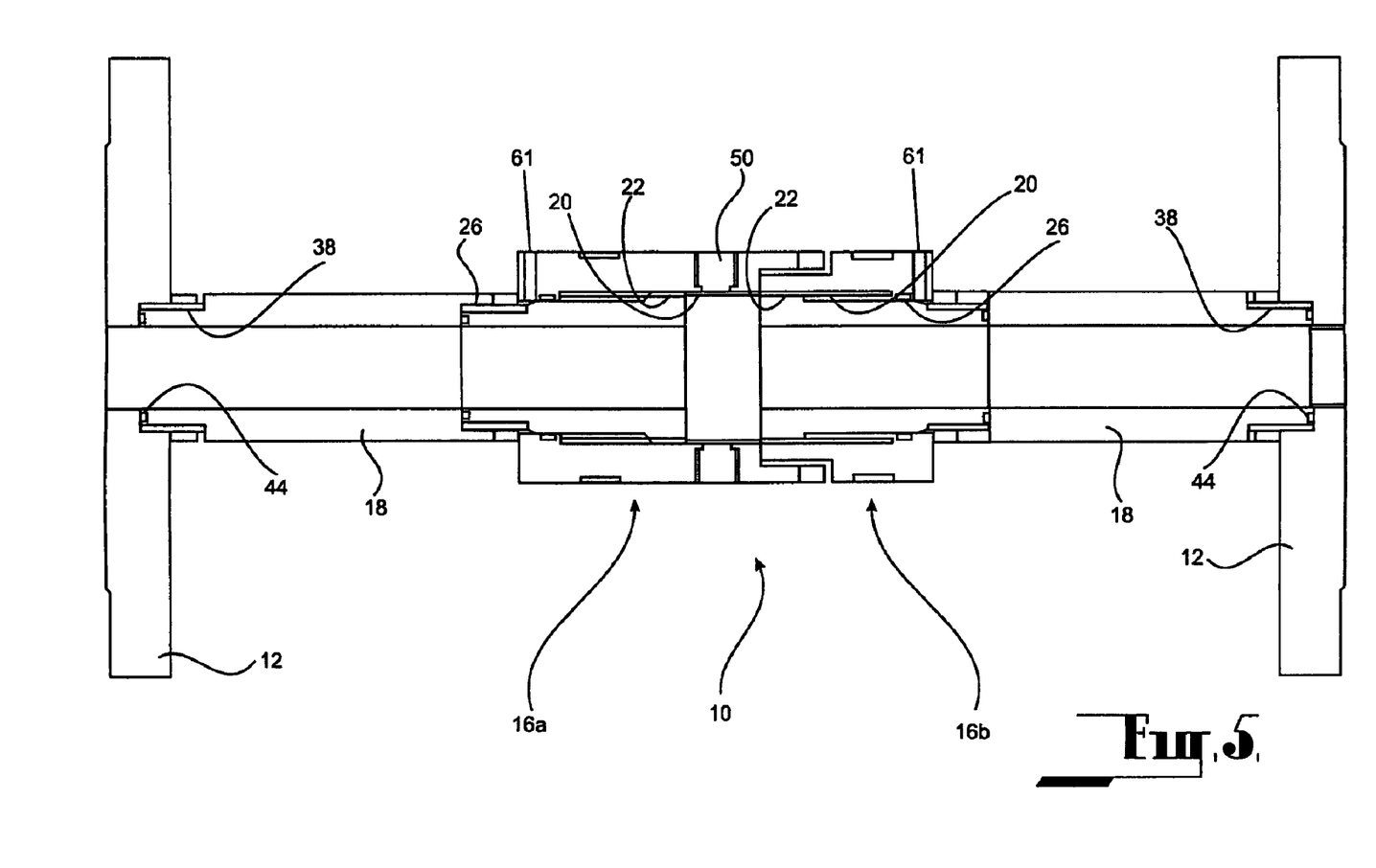
FIG. 5 is a is a side elevation of a pipe insert, according to a fourth embodiment of the invention

The fourth embodiment of the invention is shown at FIG. 5. In the case of the fourth embodiment it is of similar form to the first embodiment and the same reference numerals are used in relation to corresponding components. The principal difference between the embodiments is that the fourth embodiment does not have the end retention caps of the first embodiment and the seals 26 between the central portion and the respective outer end [portions are accommodated in internal annular grooves which are formed in the inner face of the central portions inward of each end. The seals 26 take the form of single sided hydraulic rod seals which are energised by the fluid pressure present within the central portion.

To lock the central portion relative to each end portion in place each end of the central portion is provided with a set of radial bores 61 which are associated with locking screws which when tightened will bear upon the respective end portion to retain the central portion in position.

In addition the central portion comprises two sub portions which are threadably and sealingly inter-engaged.

The method of assembly, adjustment and installation of the insert 10 according to the first embodiment will now be described. It will be understood that the seals associated with the various components to be assembled will already be located in place during the assembly.

Prior to assembly, adjustment and installation of the insert 10, the flanges 13, if not present already, are welded, or otherwise fixed, into position on the pipe ends 11. An accurate measurement of the separation between the flanges 13 is then made.

A determination of the appropriate number of portions from which to assemble the insert 10 is then made, such a determination being based on the size and spacing of the pipe ends 11. Assembly of the insert 10 is then commenced.

The first step in the assembly of the insert 10 will generally be that of fitting the appropriate appliances to, and/or plugging, the bores 50 and 52 of the central portions. If as in the case of the second embodiment as shown at FIG. 2 the ball valve 58 is required, the ball member 60 is inserted into the central portion 16, and the retaining covers 62 are then screwed into either side of the central portion 16 to retain the ball member 60 therebetween. The ball valve lever assembly 56 is then screwed into the appropriate bore 50 or 52. The lifting eye 54 will often be fitted to one bore to facilitate subsequent installation of the insert 10. The end portions 16 are then screwed into the central portion 16 and the retention caps 28 are then slid over the those end portions 18. If further end portions 18' are required, they are screwed into the outer ends of the end portions 18. Retention caps 28' are then slid over the further end portions 18'. If additional further end portions 18" are required, they are screwed into the outer ends of the further end portions 18'. Retention caps 28" are then slid over the additional further end portions 18". The flanges 12, selected according to the dimensions of the flanges 13 to which they are to be connected, are then screwed onto the outer ends of the outermost sections 18, 18' or 18".

The interconnected sections are screwed with respect to each other until the overall length is adjusted according to the spacing of the flanges 13, allowing for gaskets and the like. After correct adjustment of the length of the insert 10, the retention caps are screwed into position to lock the interconnected sections and to effect the sealing therebetween. The appropriate tightening torque is provided by means of hook spanners engaged with the notches 36, as described above.

The insert 10 is then installed. To this end, the lifting eye 54, if fitted, may be utilised to lift the insert 10 into position. The flanges 12 are then connected to the flanges 13 in the conventional manner to complete the installation.

The insert 10 may be adjusted in the at least one longitudinal axis, according to the longitudinal dimension(s) of the control element which will ultimately be installed in its place.

The insert 10 can then be fitted during the construction phase in the piping systems at all control element locations, allowing for the appropriate spacing and piping alignment. Testing and cleaning can then be carried out without the need to remove the insert 10.

Moreover, the requisite testing of the pipe insert for quality control purposes and length determination of the pipe insert 10 may be effected prior to dispatch to the site, thereby eliminating the need for testing of the insert 10 in the field.

It is a feature of each of the embodiments that when the pipe insert is in use and is under pressure the axial loading which is applied to between the end portions and the central portion is taken by the threaded interconnection therebetween. There is no compressive force which is applied to the end portions in order to retain the portions together or a clamping force applied between the central portion and the end portions to effect the required sealing. In addition in order to vary the spacing between the ends of the pipe insert it is merely necessary to unlock the locking screws that retain the portions in position and to rotate the central portion in the required direction to cause the requisite displacement of the free ends of the pipe insert. Furthermore this action can be done when the pipe insert is under pressure which can be a situation which can occur during the testing of the integrity of the pipe insert prior to installation.

It is a further feature of each of the embodiments that when the pipe insert is in place the fluid communication between the pipe ends corresponds with that which would exist in the operating circuit. In addition in the circumstances where an a flow control device is not provided across the flow path by the pipe insert the communication is such that the required monitoring and/or cleaning "pigs" are able to pass through the circuit including the pipe inserts The present invention is not to be limited in scope by any of the specific embodiments described herein. These embodiments are intended for the purpose of exemplification only. Functionally equivalent products, elements and methods are clearly within the scope of the invention as described herein.

The claims defining the invention are as follows:

1. A pipe insert which in use is to provide a connection between at least two spaced pipe ends which are fixed relative to each other, said pipe ends each having first connection means enabling the connection of an appliance between the pipe ends, the insert being intended in use to extend across a space between the pipe ends to replace the appliance to provide a fluid tight interconnection between each pipe end and an abutting end of the insert and to provide substantially uninhibited fluid flow access between pipe ends the insert having at two end portions and a central portion interconnected to adjacent ends of the end portions, the portions being threadably inter-engaged, wherein a threaded connection of one end portion to the central portion is of an opposite hand to a threaded connection of the other end portion to the central portion whereby a relative axial displacement is varied by causing relative rotation of one or more of the portions relative to the adjacent portion, to be able to vary the relative displacement between the pipe ends to correspond to the spacing between the pipe ends, a seal provided between each end portion and the central portion to sealingly isolate an interior of the pipe insert from an exterior of the pipe insert, a free end of the end portions each having a second connection means adapted in use to be sealing interconnected with the respective first connection means, wherein the second connection means are removable from the free ends of the end portions and the second connection means which are affixed to the free ends are selectable from a plurality of differing forms of second connection means adapted to conform with the first connection means of the pipe ends, each second connections being associated with a seal which is located at the junction of the second connection and the end portion.

2. A pipe insert as claimed at claim 1 wherein the pipe insert is adapted to receive at least one of a selection of flow control and/or sensing elements.

3. A pipe insert as claimed at claim 1 wherein the second connections are threadably engaged with threaded formations on the free ends of the end portions.

4. A pipe insert as claimed at claim 1 wherein the end portions of the insert are displaceable along a common axis.

5. A pipe insert as claimed at claim 1 to wherein the end portions of the insert are displaceable along at least two axes which are angularly displaced from each other.

6. A pipe insert as claimed at claim 5 wherein the end portions of the insert are displaceable along two axes which are substantially perpendicular to each other.

7. A pipe insert as claimed at claim 1 wherein the end portions of the insert are displaceable along at least two axes which are spaced from each other.

8. A pipe insert as claimed at claim 1 wherein the first connection means each comprise a flange at the respective pipe end and said second connection means each comprise a flange at the respective end wherein the first and second connection means are of a complementary form.

9. A pipe insert as claimed at claim 1 wherein the pipe insert is able to accommodate the flow and pressure conditions anticipated for the appliance in use.

10. A pipe insert as claimed at claim 9 wherein the internal diameter of the end portions is substantially similar to the internal diameter of the pipes associated with the pipe ends.

11. A pipe insert as claimed at claim 9 wherein the pipe insert is configured and arranged such that it can accommodate the anticipated mechanical loadings anticipated to be applied to the appliance in use.

12. A pipe insert as claimed at claim 1 wherein the pipe insert comprises a plurality of central portions which are threadably engaged with intermediate portions which are of similar form to the end portions.

13. A pipe insert as claimed at claim 1 wherein the seal between each end portion and the central portion is located intermediate of the threaded formation and the free end of the respective end portion.

14. A pipe insert which in use is to provide a connection between at least two spaced pipe ends which are fixed relative to each other, said pipe ends each having first connection means enabling the connection of an appliance between the pipe ends, the insert being intended in use to extend across a space between the pipe ends to replace the appliance to provide a fluid tight interconnection between each pipe end and an abutting end of the insert and to provide substantially uninhibited fluid flow access between pipe ends the insert having at two end portions and a central portion interconnected to adjacent ends of the end portions, the portions being threadably inter-engaged, wherein a threaded connection of one end portion to the central portion is of an opposite hand to a threaded connection of the other end portion to the central portion whereby a relative axial displacement is varied by causing relative rotation of one or more of the portions relative to the adjacent portion, to be able to vary the relative displacement between the pipe ends to correspond to the spacing between the pipe ends, a seal provided between each end portion and the central portion to sealingly isolate an interior of the pipe insert from an exterior of the pipe insert, a free end of the end portions each having a second connection means adapted in use to be sealing interconnected with the respective first connection means, the central portion being concentrically received over the end portions and wherein a seal retention cap is provided at each end of the central portion, the seal at the respective end of the central portion being retained between the seal retention cap and the end of the central portion.

15. A pipe insert as claimed at claim 14 wherein each seal retention cap comprises an annular member which is threadably engaged with an external thread provided at the end of the central portion, said annular member has an inwardly directed flange having an inner diameter greater than the external diameter of the respective end portion, the cap retention element having an inner annular recess which cooperates with a recess of corresponding form at the end of the central portion to accommodate the seal.

16. A pipe insert which in use is to provide a connection between at least two spaced pipe ends which are fixed relative to each other, said pipe ends each having first connection means enabling the connection of an appliance between the pipe ends, the insert being intended in use to extend across a space between the pipe ends to replace the appliance to provide a fluid tight interconnection between each pipe end and an abutting end of the insert and to provide substantially uninhibited fluid flow access between pipe ends the insert having at two end portions and a central portion interconnected to adjacent ends of the end portions, the portions being threadably inter-engaged, wherein a threaded connection of one end portion to the central portion is of an opposite hand to a threaded connection of the other end portion to the central portion whereby a relative axial displacement is varied by causing relative rotation of one or more of the portions relative to the adjacent portion, to be able to vary the relative displacement between the pipe ends to correspond to the spacing between the pipe ends, a seal provided between each end portion and the central portion to sealingly isolate an interior of the pipe insert from an exterior of the pipe insert, a free end of the end portions each having a second connection means adapted in use to be sealing interconnected with the respective first connection means, wherein the pipe insert includes a flow control and/or sensing elements.

* * * * *